(12) United States Patent
Iida et al.

(10) Patent No.: US 6,597,480 B1
(45) Date of Patent: Jul. 22, 2003

(54) WAVELENGTH TUNABLE FILTER APPARATUS

(75) Inventors: Masanori Iida, Katano (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/537,767

(22) Filed: Mar. 30, 2000

(30) Foreign Application Priority Data

Mar. 31, 1999 (JP) .......................................... 11-093333

(51) Int. Cl.[7] .................................................. H04J 14/02
(52) U.S. Cl. ...................... 359/124; 359/127; 359/161; 359/173; 359/187; 359/193
(58) Field of Search ................................ 359/124, 127, 359/161, 173, 187, 193

(56) References Cited

U.S. PATENT DOCUMENTS

| | | | |
|---|---|---|---|
| 5,369,515 A | * | 11/1994 | Majima ...................... 359/125 |
| 5,724,166 A | * | 3/1998 | Nakata ........................ 359/120 |
| 5,739,934 A | * | 4/1998 | Nomura et al. ............. 359/124 |
| 6,204,959 B1 | * | 3/2001 | Fujita et al. ............. 359/337.2 |

* cited by examiner

Primary Examiner—Leslie Pascal
Assistant Examiner—Dzung Tran
(74) Attorney, Agent, or Firm—Smith, Gambrell & Russell, LLP (57) ABSTRACT

The apparatus has: a wavelength tunable filter 1; a photoelectric conversion part 2 which converts transmitted light received from the wavelength tunable filter 1 into a received light intensity signal; a received light intensity detecting part 3 which detects the intensity of the received light intensity signal; a signal component detecting part 8 which detects a signal component from the received light intensity signal; a signal intensity detecting part 9 which detects the intensity of the signal component; an intensity variation detecting part 4 which detects an intensity variation in the received light intensity signal which is detected and an intensity variation in the signal component; and a peak position detecting part 5 and a wavelength scanning part 6 which scan and a wavelength to be selected by the wavelength tunable filter 1 based on the two detected variations.

15 Claims, 10 Drawing Sheets

WAVELENGTH TUNABLE FILTER APPARATUS

BACKGROUND OF THE INVENTION

1. Field of the Invention

The present invention relates to a wavelength-divided multiplexing (WDM) transmission system for optical communication and to a wavelength tunable filter apparatus used for an apparatus of such a system.

2. Related Art of the Invention

In the optical communication field, a wavelength-multiplexed optical transmission method is already known which is used to transmit multi-channel signals on one optical fiber. A wavelength-multiplexed optical transmission method is a method in which an optical wavelength coupler wavelength-multiplexes signals of respective channels with light having different wavelengths from each other, the signals are transmitted through one optical fiber from the sending side to the receiving side, a wavelength filter separates on the receiving side the multiplexed transmission light with respect to the respective wavelengths and the signals are reproduced. For this reason, a wavelength tunable filter is used which can change a wavelength which is to be received.

In this manner, it is possible to freely extract light having a desired wavelength from light which is formed of a number of multiplexed wavelengths. This is the reason that a wavelength tunable filter apparatus is being explored which is addition of a wavelength-tuning function of correctly selecting a received wavelength to a wavelength tunable filter.

Figure 10:
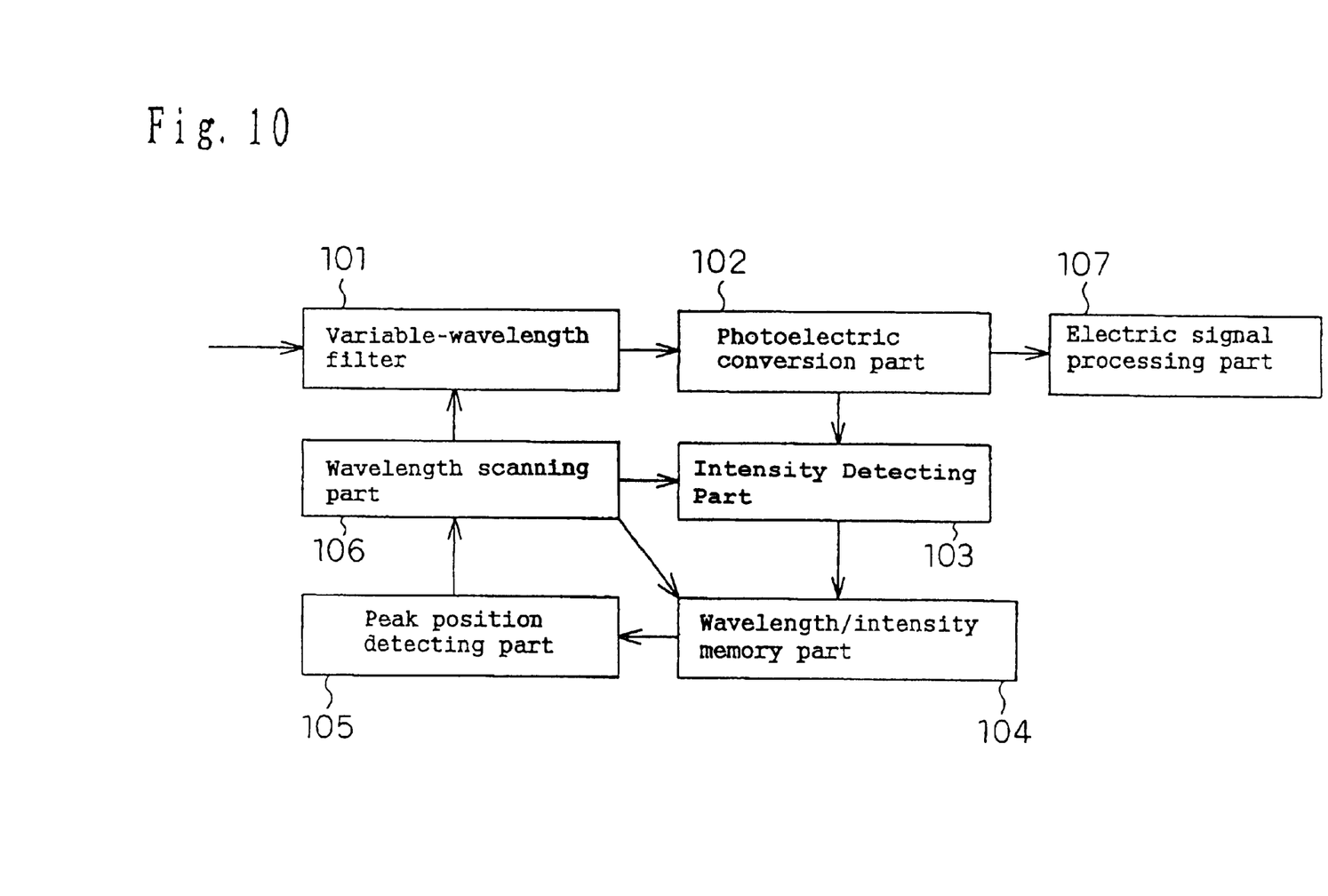
FIG. 10 is a structure diagram of a conventional wavelength tunable filter apparatus.

FIG. 10 shows a structure of a conventional wavelength tunable filter apparatus and a flow of a data signal in each part. In FIG. 10, denoted at 101 is a wavelength tunable filter, denoted at 102 is a photoelectric conversion part, denoted at 103 is a received light intensity detecting part, denoted at 104 is a wavelength/intensity memory part, denoted at 105 is a peak position detecting part, and denoted at 106 is a wavelength scanning (changing) part, which form the wavelength tunable filter apparatus. Denoted at 107 is an electric signal processing part.

Now, operations of such a conventional apparatus will be described. The photoelectric conversion part 102 converts an optical signal from the wavelength tunable filter 101 into a photoelectrically converted signal. The photoelectrically converted signal is supplied to the wavelength scanning part 107 while partially detected by the received light intensity detecting part 103 to obtain an average value of the photoelectrically converted signal, namely, an average received light intensity. The average received light intensity is stored in the wavelength/intensity memory part 104 together with wavelength position data obtained from the wavelength scanning part 106.

While the wavelength scanning part 106 changes a wavelength of the wavelength tunable filter 101, based on the information stored in the wavelength/intensity memory part 104, the peak position detecting part 105 specifies a wavelength at which the average received light intensity becomes maximum and supplies the position of such a wavelength to the wavelength scanning part 106, whereby the wavelength is set.

On the other hand, another method already proposed (e.g., Japanese patent no. 2,655,479) requires that wavelength-multiplexed light is supplied to a wavelength tunable filter, received light intensities of light having two wavelengths which are adjacent to a wavelength which is to be selected are monitored and a difference between the intensities is optimized.

However, in the conventional wavelength tunable filter apparatus described above, when a received light intensity at the wavelength tunable filter 101 decreases, in order to determine whether the set wavelength of the wavelength tunable filter 101 has shifted toward the short-wavelength side or the long-wavelength side with respect to a transmitted oscillation wavelength of a light source, it is necessary to detect a received light intensity after shifting the set wavelength of the wavelength tunable filter 101 toward the short-wavelength side and the long-wavelength side and to specify a direction which increases a received light intensity.

Thus, the process described above demands to change a wavelength at least twice, and when a wavelength is changed in a direction which decreases a received light intensity, a signal quality may temporarily degrade owing to the decrease in the received light intensity.

Further, the method which requires to monitor an average received light intensity of light having adjacent wavelengths has a problem that it may become impossible to correctly set a wavelength if original intensity levels of the light having adjacent wavelengths change.

SUMMARY OF THE INVENTION

Noting the problems as above with such conventional wavelength tunable filter apparatuses, the present invention aims at providing a wavelength tunable filter apparatus which allows to accurately set a wavelength once again when a received light intensity decreases, by means of a simple wavelength change using only light which has a wavelength to be selected.

The $1^{st}$ invention of the present invention (corresponding to claim 1) is a wavelength tunable filter apparatus, comprising:

a wavelength tunable filter which can change a wavelength to be selected for an inputted optical signal;

a photoelectric conversion part which converts transmitted light received from said wavelength tunable filter into a received light intensity signal;

a received light intensity detecting part which detects an intensity of said received light intensity signal which is converted;

a signal component detecting part which detects a signal component from said received light intensity signal;

a signal intensity detecting part which detects an intensity of said signal component which is detected;

an intensity variation detecting part which detects a variation in said received light intensity detected by said received light intensity detecting part and an intensity variation in said signal component detected by said signal intensity detecting part; and wavelength setting means which, on the basis of said detected both variations, causes said wavelength tunable filter to change the wavelength to be selected as to set the wavelength appropriately such that an output from said photoelectric conversion part satisfies a predetermined condition.

The $2^{nd}$ invention of the present invention (corresponding to claim 2) is the wavelength tunable filter apparatus of said the $1^{st}$ invention, wherein a direction of the changing of the wavelength to be selected by said wavelength tunable filter is determined based on said both variations.

The 3$^{rd}$ invention of the present invention (corresponding to claim 3) is the wavelength tunable filter apparatus of said the 1$^{st}$ invention, wherein the wavelength to be selected by said wavelength tunable filter is changed by a feedback method.

The 4$^{th}$ invention of the present invention (corresponding to claim 4) is the wavelength tunable filter apparatus of said the 1$^{st}$ invention, wherein said wavelength setting means comprises a wavelength/intensity memory part which stores in advance reference data which describe a state of the intensity variation in said received light intensity signal in a direction in which said wavelength tunable filter changes the wavelength and/or a state of the intensity variation in said signal component, and the wavelength to be selected by said wavelength tunable filter is changed in accordance with comparison of said reference data against at least one of said state of the detected variations.

The 5$^{th}$ invention of the present invention (corresponding to claim 5) is the wavelength tunable filter apparatus of said the 1$^{st}$ invention, wherein said wavelength setting means sets as a set wavelength a wavelength which maximizes the intensity of said received light intensity signal.

The 6$^{th}$ invention of the present invention (corresponding to claim 6) is the wavelength tunable filter apparatus of said the 1$^{st}$ invention, wherein said wavelength setting means sets as a set wavelength a wavelength which maximizes the intensity of said signal component.

The 7$^{th}$ invention of the present invention (corresponding to claim 7) is the wavelength tunable filter apparatus of said the 1$^{st}$ invention, wherein said wavelength setting means sets as a set wavelength a wavelength which is between a wavelength which maximizes the intensity of said signal component and a wavelength which maximizes the intensity in said signal component.

The 8$^{th}$ invention of the present invention (corresponding to claim 8) is the wavelength tunable filter apparatus of said the 1$^{st}$ invention, wherein said a difference between said both variations is further detected and said set wavelength is set based on the difference.

The 9$^{th}$ invention of the present invention (corresponding to claim 9) is the wavelength tunable filter apparatus of said the 4$^{th}$ invention, wherein when a relationship between said both two variations is such a relationship which is indicative of predetermined abnormality, said wavelength setting means transmits a signal notifying the abnormality and/or stops wavelength scanning.

The 10$^{th}$ invention of the present invention (corresponding to claim 10) is the wavelength tunable filter apparatus of any one of said the 1$^{st}$ through 9$^{th}$ inventions, wherein an electric signal detected by said signal component detecting part is a signal which is formed by multiplexing some modulated sub-carrier frequency component signals, one of the sub-carrier signals is selectively extracted, and the intensity of the extracted signal component is supplied to said signal intensity detecting part.

The 11$^{th}$ invention of the present invention (corresponding to claim 11) is the wavelength tunable filter apparatus of any one of said the 1$^{st}$ through 9$^{th}$ inventions, wherein an electric signal detected by said signal component detecting part is a signal which is formed by multiplexing some modulated sub-carrier frequency component signals and non-modulated sub-carrier frequency component signal, non-modulated sub-carrier signal is selectively extracted, and the intensity of the extracted signal component is supplied to said signal intensity detecting part.

The 12$^{th}$ invention of the present invention (corresponding to claim 12) is the wavelength tunable filter apparatus of according to said the 1$^{st}$ invention, wherein used as said wavelength tunable filter is a wavelength tunable filter which is formed by any one of a filter using a diffraction grating, a fiber diffraction grating, an interference film filter, a Fabry-Perot etalon filter, an acoustic optic filter, and a Mach-Zehnder filter or a wavelength tunable filter which is formed by a combination of these filters.

The 13$^{th}$ invention of the present invention (corresponding to claim 13) is an optical receiving apparatus which receives at least one wavelength light and comprises:

the wavelength tunable filter apparatus of said the 1$^{st}$ invention; and a signal outputting part which outputs an electric signal component from said signal component detecting part of said wavelength tunable filter.

The 14$^{th}$ invention of the present invention (corresponding to claim 14) is an optical transmission apparatus, comprising:

an optical transmitting apparatus which comprises one electro-optic conversion part which receives an electric signal and electro-optically converts the electric signal into an optical signal having a predetermined wavelength, or a plurality of electro-optic conversion parts each receiving an electric signal and electro-optically converting the electric signals into optical signals whose wavelengths are different from each other, and an optical coupler part which combines the optical signals outputted from said electro-optic conversion part or parts; and the optical receiving apparatus of said the 13$^{th}$ invention which directly or indirectly receives an optical signal outputted from said optical transmitting apparatus.

The 15$^{th}$ invention of the present invention (corresponding to claim 15) is an optical transmission system, comprising:

an optical transmitting apparatus which comprises one electro-optic conversion part receives an electric signal and electro-optically converts the electric signal into an optical signal having a predetermined wavelength, or a plurality of electro-optic conversion parts each receiving an electric signal and electro-optically converting the electric signals into optical signals whose wavelengths are different from each other, and an optical coupler part which combines the optical signals outputted from said electro-optic conversion part or parts;

an optical transmission path for transmitting an optical signal outputted from said optical transmitting apparatus; and the optical receiving apparatus of said the 13$^{th}$ invention which receives an optical signal outputted from said optical transmission path.

DETAILED DESCRIPTION OF THE PREFERRED EMBODIMENTS

In the following, the present invention will be described with reference to the drawing which show preferred embodiments.

First Preferred Embodiment

A wavelength tunable filter apparatus according to a first preferred embodiment of the present invention will be described with reference to FIGS. 1 through 4.

Figure 1:
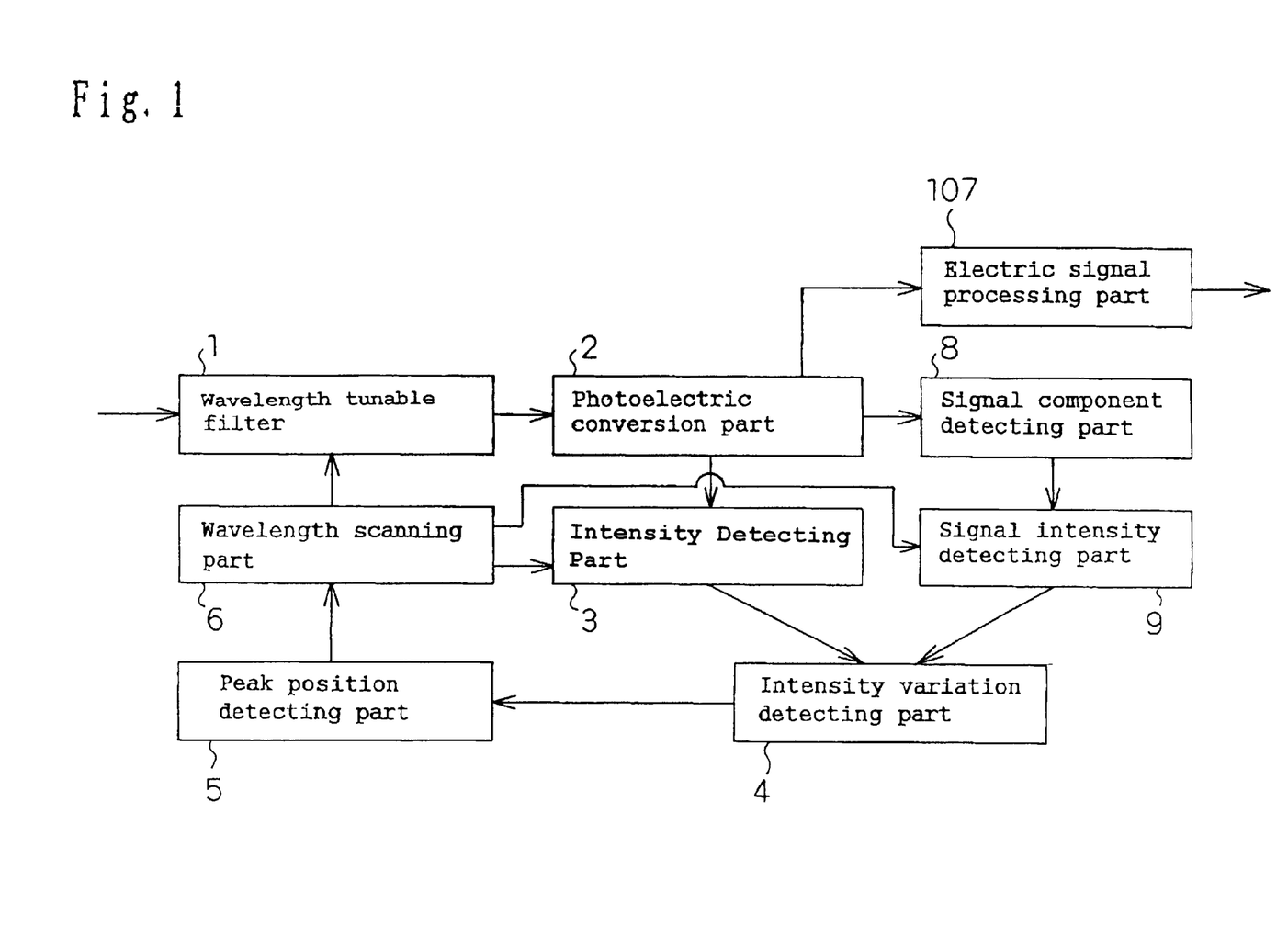
FIG. 1 is a structure diagram of a wavelength tunable filter apparatus according to a first preferred embodiment of the present invention.

FIG. 1 is a structure diagram of the wavelength tunable filter apparatus according to the first preferred embodiment of the present invention. In FIG. 1, denoted at 1 is a wavelength tunable filter, denoted at 2 is a photoelectric conversion part, denoted at 3 is a received light intensity detecting part, denoted at 4 is an intensity variation detecting part, denoted at 5 is a peak position detecting part, denoted at 6 is a wavelength scanning part, denoted at 8 is a signal component detecting part, and denoted at 9 is a signal intensity detecting part. Of these, the peak position detecting part 5 and the wavelength scanning part 6 are one example of wavelength setting means according to the present invention.

Figure 2:
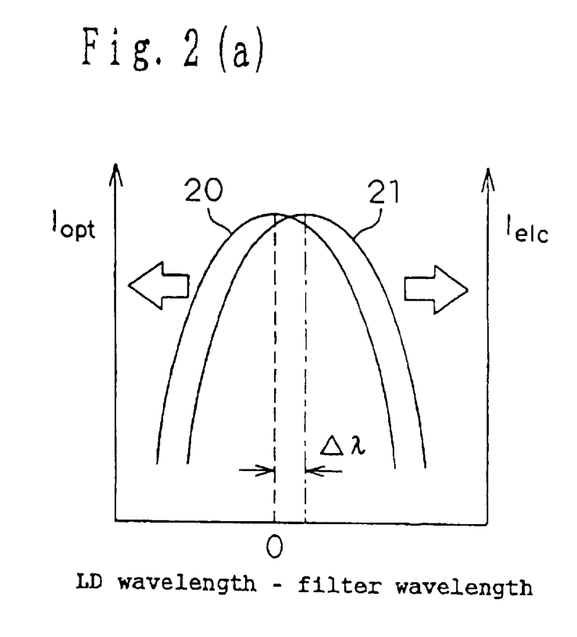
FIG. 2 is a diagram showing behaviors of a change in a received light intensity received by the wavelength tunable filter apparatus and a signal intensity change according to the first preferred embodiment of the present invention.

Meanwhile, FIG. 2 is a conceptual diagram for describing operations of the wavelength tunable filter apparatus according to the first preferred embodiment of the present invention. As described herein, received light is wavelength-multiplexed light, and a certain modulation signal is applied to light having a wavelength to be selected by the wavelength tunable filter apparatus among light having respective wavelengths.

In FIG. 2, denoted at 30 is an instantaneous photo-electrically converted signal intensity which is expressed by measuring a photo-electrically converted signal intensity detected by the received light intensity detecting part 3 along a horizontal axis which is a time axis, with a modulation signal waveform superimposed around an average received light intensity Iopt. Denoted at 31 is an instantaneous signal intensity which is obtained as the signal component detecting part 8 removes a Iopt component and accordingly extracts only a modulation signal component, and denoted as Ielc is an average signal intensity of the instantaneous signal intensity.

Denoted at 20 is a curve which expresses a behavior of the average received light intensity Iopt which is obtained as the wavelength tunable filter 1 receives light and a wavelength of the filter is changed, and denoted at 21 is a curve which expresses a behavior of the average signal intensity Ielc.

Figure 3:
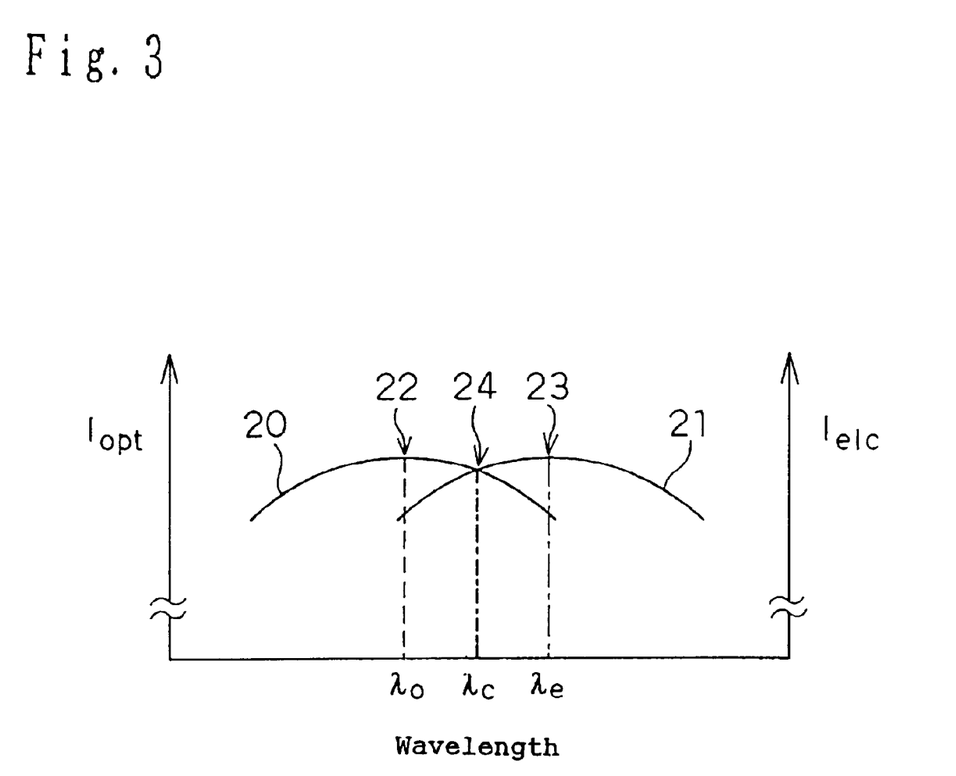
FIG. 3 is a diagram showing an average received light intensity and a positional relationship regarding a peak wavelength of an average signal intensity in according to the first preferred embodiment of the present invention.

FIG. 3 is a conceptual diagram for describing a wavelength setting operation according to the first preferred embodiment. Denoted at 22 is a wavelength position λo at which the average received light intensity Iopt reaches a maximum value (peak) denoted at 23 is a wavelength position λe at which the average signal intensity Ielc reaches a maximum value (peak), and denoted at 24 is a wavelength position λc which is set between λo and λe and which is halfway between the two wavelengths in FIG. 2 for the convenience but may be at any other position between the two wavelengths. Further, with respect to λo and λe, although λo is herein located on the short-wavelength side, the positional relationship between the wavelengths can be opposite to this.

Figure 4:
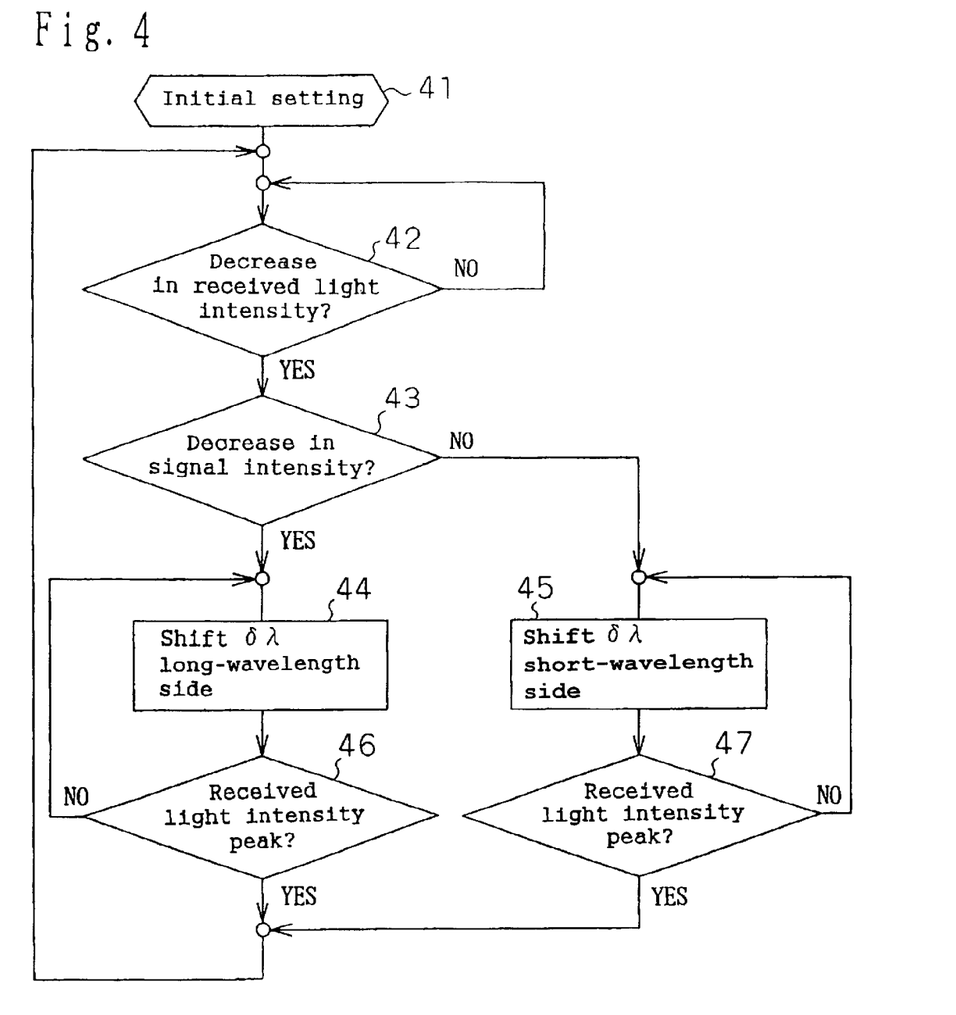
FIG. 4 is a flow chart showing a wavelength setting operation according to the first preferred embodiment of the present invention.

FIG. 4 is a flow chart showing an operation for setting the wavelength to be selected at such a wavelength position where the average received light intensity becomes a maximum value according to the first preferred embodiment. In FIG. 4, a step 41 expresses an initial setting operation, a step 42 expresses a judgment regarding whether there is an increase or a decrease in the average received light intensity, a step 43 expresses a judgment regarding whether there is an increase or a decrease in the average signal intensity, a step 44 expresses an operation of slightly moving a central wavelength of the filter toward the long-wavelength side, a step 45 expresses an operation of slightly moving the central wavelength of the filter toward the short-wavelength side, and steps 46 and 47 denote peak judging parts for the average received light intensity.

Next, the operations according to the first preferred embodiment will be described. Wavelength-multiplexed light impinging upon the wavelength tunable filter 1 is selected of a wavelength in accordance with a transmission characteristic of the wavelength tunable filter 1, and output light is converted into a photoelectrically converted signal by the photoelectric conversion part 2. With respect to an instantaneous time jitters in the photoelectrically converted signal, a modulation signal waveform is superimposed around the average received light intensity Iopt which is averaged out by the received light intensity detecting part 3 as denoted at a curve 30 shown in FIG. 2.

The average received light intensity averaged out by the received light intensity detecting part 3 is supplied to the intensity variation detecting part 4. On the other hand, from the photoelectrically converted signal, only a modulation signal component superimposed by the signal component detecting part 8 is extracted. The Iopt component is removed from the modulation signal component as denoted at a curve 31 shown in FIG. 2, and therefore, is centered around the average signal intensity Ielc which is averaged out by the signal intensity detecting part 9. The average signal intensity as such is supplied to the intensity variation detecting part 4.

The intensity variation detecting part 4 monitors behaviors of increases and decreases in the average received light intensity and the average signal intensity, and based on level fluctuation information available from the intensity variation detecting part 4, the peak position detecting part 5 detects and sets a peak wavelength position of either one of the average received light intensity and the average signal intensity while the wavelength scanning part 6 slightly changes the filter wavelength of the wavelength tunable filter 1. The operations shown in FIG. 4 ensure that the received light intensity reaches a peak.

Further specifically describing while partially repeating the same description, the behaviors of the average received light intensity and the average signal intensity with respect to the filter wavelength are, as denoted respectively at the curves 20 and 21, different from each other along a wavelength axis, and as shown in FIGS. 2 and 3, the wavelengths $\lambda o$ and $\lambda e$ at which the two average intensities become maximum respectively are away from each other by $\Delta\lambda$. This is a phenomenon which occurs when a semiconductor laser is modulated directly, because of expansion (chirping) of an oscillation spectrum of the semiconductor laser in response to direct modulation.

Meanwhile the present invention can be applied to any modulation method principally because the transmission spectrum expands further than the case where modulation is not executed though external modulation is executed.

A description will now be given, with reference to FIGS. 3 and 4, on an operation where the wavelength is actually set to the wavelength position $\lambda o$ at which the average received light intensity becomes maximum and wavelength shift occurred. Since Iopt decreases when a shift occurs on a relative wavelength between the laser wavelength and the filter wavelength after the initial setting operation step 41, this is detected by the step 42 of detecting a variation in the average received light intensity, and whether there is an increase or a decrease in the average signal intensity is judged at the step 43 of detecting the average signal intensity. For example, if the filter wavelength shifts toward the short-wavelength side, the average received light intensity decreases and the average signal intensity decreases as well as shown in FIG. 3. Conversely, if the filter wavelength shifts toward the long-wavelength side, the average signal intensity increases. Based on this tendency, the set wavelength is re-adjusted at the step 44 of shifting the filter wavelength toward the long-wavelength side in the former case, whereas the set wavelength is re-adjusted at the step 45 of shifting toward the short-wavelength side in the latter case. After the respective steps, at the steps 46, 47 of detecting a received light intensity peak, the adjustment is stopped upon arrival of the average received light intensity at a peak, i.e., at the wavelength $\lambda o$.

It is possible to set the wavelength based on a similar approach where the wavelength is to be set at the wavelength position $\lambda e$ which maximizes the average signal intensity.

The structure as described above makes it possible to accurately detect a relative variation of the filter wavelength and a direction of the variation, using only light whose wavelength is the one to be selected among the wavelength-multiplexed light, which in turn creates an effect that it is possible to easily set the wavelength to the set wavelength once again.

Second Preferred Embodiment

A wavelength tunable filter apparatus according to a second preferred embodiment of the present invention will be described with reference to FIGS. 3, 5 and 6.

Figure 5:
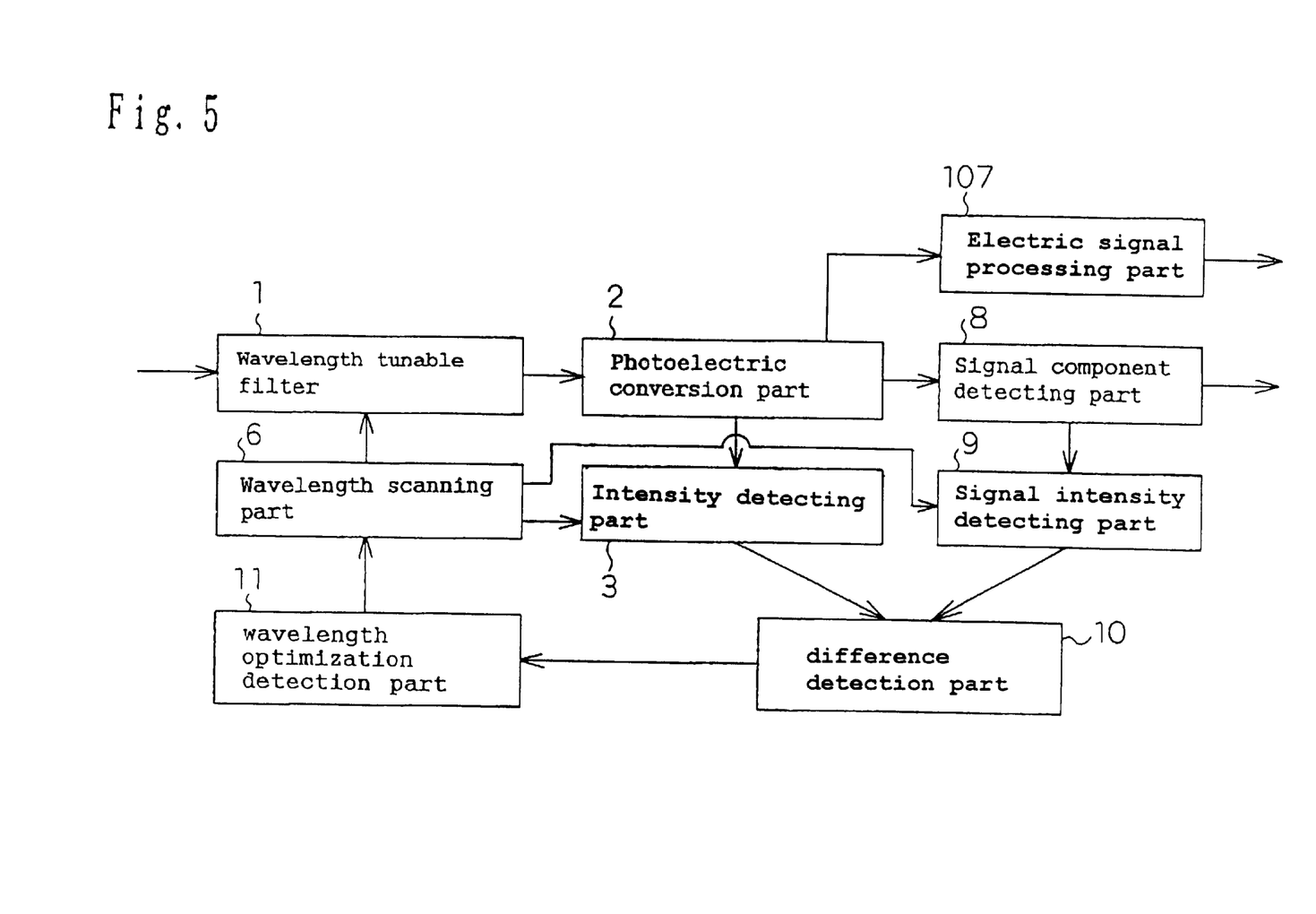
FIG. 5 is a structure diagram of a wavelength tunable filter apparatus according to a second preferred embodiment of the present invention.

A difference in FIG. 5 from the first preferred embodiment is that the intensity variation detecting part 4 and the peak position detecting part 5 shown in FIG. 1 are changed to a difference detection part 10 which serves as an intensity variation detecting part which detects a difference value in an average received light intensity and a difference value in an average signal intensity for every wavelength scanning and a wavelength optimization detection part 11 which detects an optimal wavelength position based on the detected difference values and supplies an off-axis signal if necessary. The other elements bearing identical reference symbols have identical functions. In FIG. 5, the wavelength optimization detection part and the wavelength scanning part 6 form the wavelength setting means.

Figure 6:
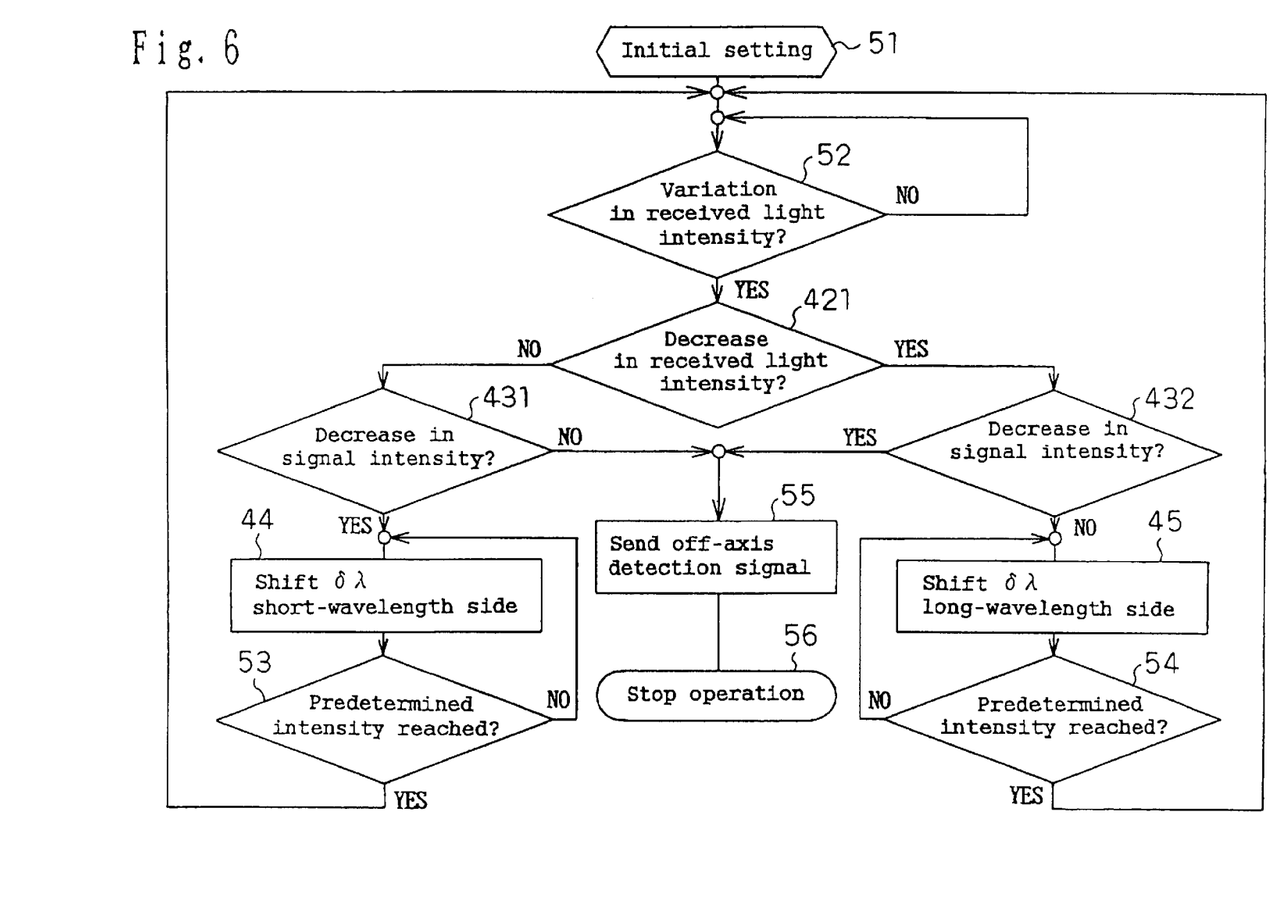
FIG. 6 is a flow chart showing a wavelength setting operation according to the second preferred embodiment of the present invention.

FIG. 6 is a flow chart showing an operation for setting to a wavelength position in case the wavelength to be selected of the wavelength tunable filter 1 is to be set to the wavelength position ($\lambda c$) 24 which is between the wavelength position ($\lambda o$) 22 at which the average received light intensity reaches a peak and the wavelength position ($\lambda e$) 23 at which the average signal intensity reaches a peak in FIG. 3. In FIG. 6, a step 51 expresses an initial setting operation, a step 52 expresses variation detection of an average received light intensity, a step 421 expresses a judgment regarding whether there is an increase or a decrease in the average received light intensity, a step 431 and 432 express a judgment regarding whether there is an increase or a decrease in the average signal intensity, a step 44 expresses an operation of slightly moving the central wavelength of the filter toward the short-wavelength side, a step 45 expresses an operation of slightly moving the central wavelength of the filter toward the long-wavelength side, steps 53 and 54 express a judgment of an optimal wavelength position in accordance with difference values, a step 55 expresses a process of sending the off-axis signal, and a step 56 expresses a process of stopping wavelength scanning.

In this operation, as in the first preferred embodiment, the received light intensity detecting part 3 detects the average received light intensity from the wavelength tunable filter 1, the signal intensity detecting part 9 detects the average signal intensity, and the two measurements are supplied to the difference detection part 10 in response to a wavelength scanning stop signal received from the wavelength scanning part 6. The difference detection part 10 detects a difference value from the average received light intensity obtained in the previous wavelength scanning and a difference value from the average signal intensity obtained in the previous wavelength scanning at the process step 52 of detecting a received light intensity variation, whether the difference values are not beyond desired tolerance values is determined. When the average received light intensity varies beyond the tolerable range, the difference value is calculated at the process step 421 of detecting a received light increase/decrease. Whether the difference value has the positive or negative sign is thereafter determined, based on which an increase or a decrease in the intensity is judged. This is followed by the step 431 or 432 of judging whether there is an increase or a decrease in the average signal intensity. After the process step 51 of the initial setting operation such that the wavelength to be selected of the wavelength tunable filter 1 is aligned to the position 24 for the wavelength $\lambda c$ in FIG. 3, if there is a shift in the filter wavelength toward the longer-wave side, the average received light intensity increases while the average signal intensity decreases as shown in FIG. 3. This is determined at the steps 421 and 431, the filter wavelength is slightly moved toward the shorter-wave side at the process step 44 of shorter-wave side scanning, and wavelength scanning is executed via the judging step 53 until a difference value in the vicinity of the optimal wavelength position stored in advance in a wavelength/intensity memory part not shown is reached. On the contrary, if there is a shift in the filter wavelength toward the shorter-wave side, the average received light intensity decreases while the average signal intensity increases. This is determined at the steps 421 and 432, the filter wavelength is slightly moved toward the longer-wave side at the process step 45 of longer-wave side scanning, and wavelength scanning is executed via the judging step 54 until a difference value in the vicinity of the optimal wavelength position stored in advance is reached.

When there is a deviation from the optical axis, variation in the level of the incident light or a very large shift in the wavelength, since such reduces or intensifies both the average received light intensity and the average signal intensity altogether, whether there is such or not is determined at the steps 421, 431 and 432. Such is notified at the process step 55 of sending an abnormality signal which indicates a deviation from the optical axis, etc., and the operation is thereafter terminated (step 56).

The structure as described above, in addition to the effect according to the first preferred embodiment, makes it possible to judge an abnormal phenomenon such as a wavelength variation and a level variation of the incident light upon the wavelength tunable filter 1 and a deviation from the optical axis.

While the preferred embodiment described above utilizes a difference the average received light intensity and a difference in the average signal intensity, the present invention is not limited to this. For example, it is possible to specify the directivity of shifting even when a difference between the average received light intensity and the average signal intensity is utilized.

Third Preferred Embodiment

A wavelength tunable filter apparatus according to a third preferred embodiment of the present invention will be described with reference to FIGS. 7 and 8.

Figure 7:
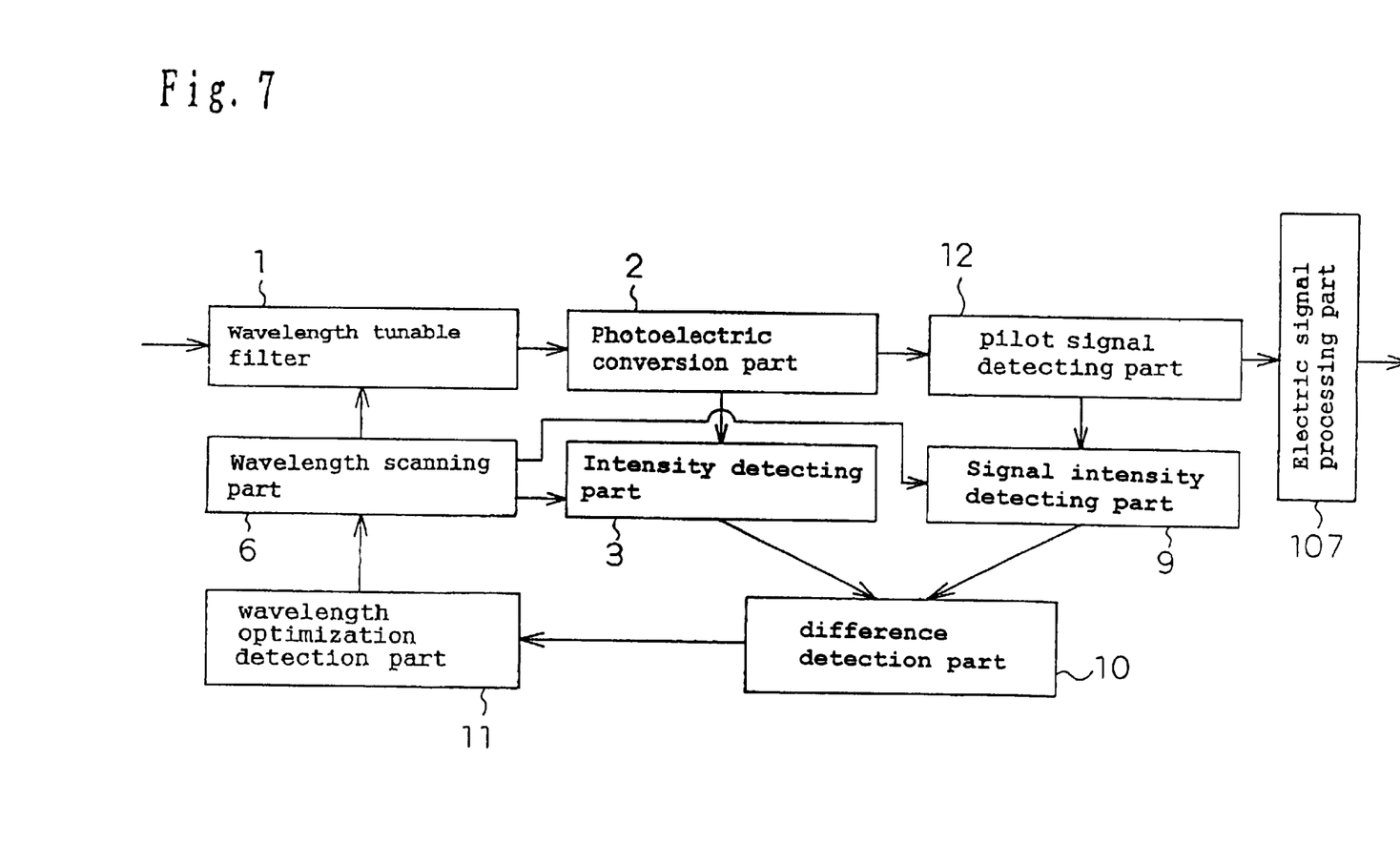
FIG. 7 is a structure diagram of a wavelength tunable filter apparatus according to a third preferred embodiment of the present invention.
Figure 8:
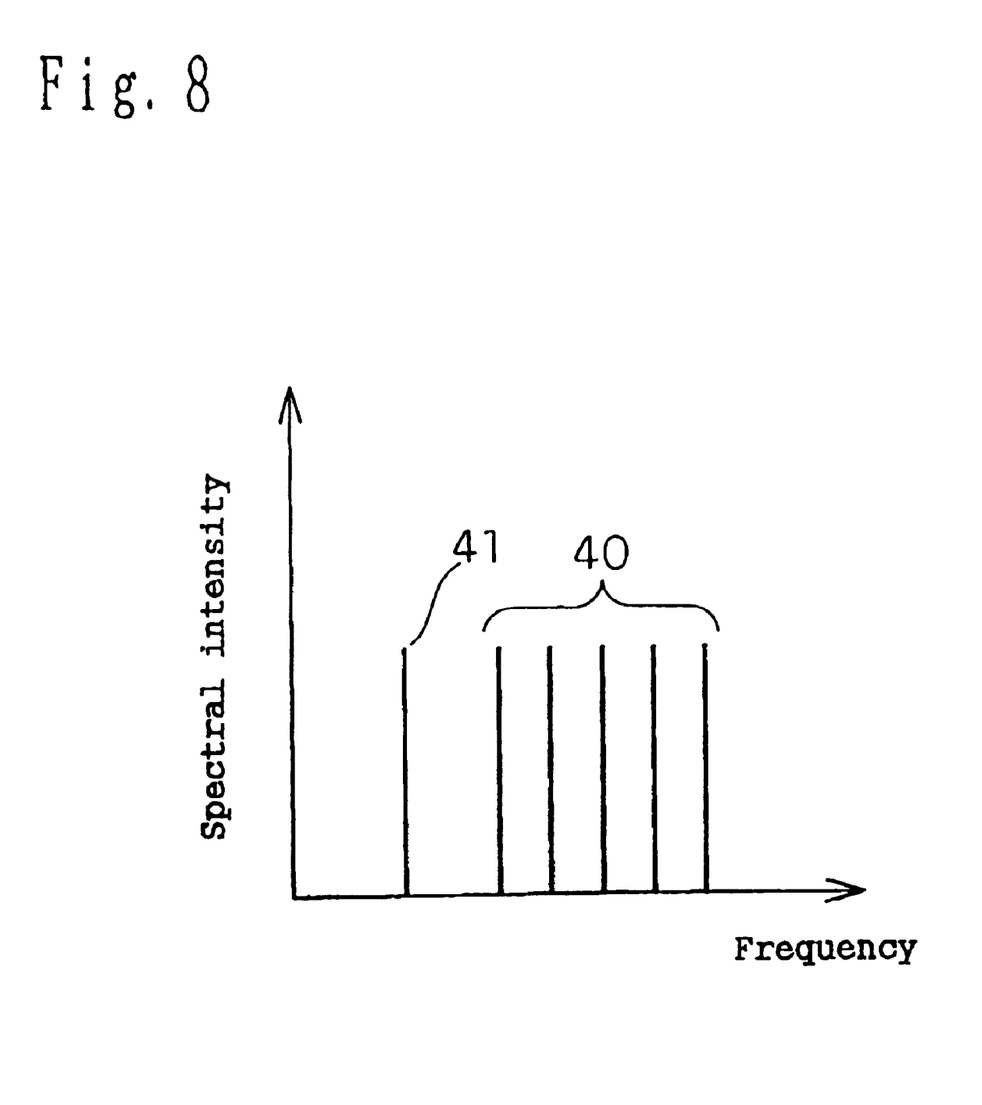
FIG. 8 is a diagram showing spectra of signals which are multiplexed with a sub-carrier, including a pilot signal, according to the third preferred embodiment of the present invention.

In FIG. 7, a difference from the second preferred embodiment is that the signal component detecting part 8 of FIG. 5 is replaced with a pilot signal detecting part 12 which serves as a signal component detecting part for extracting and detecting only a pilot signal from modulation signals which are multiplexed with a sub-carrier on a frequency axis, for example. Meanwhile, FIG. 8 shows modulation signal spectra which are multiplexed with a sub-carrier, wherein denoted at 40 is a group of modulation signals and denoted at 41 is the pilot signal which is positioned at a frequency away from the group of modulation signals.

Operations according to the third preferred embodiment are the same as those according to the second preferred embodiment described above except for that the pilot signal 41 is separated to obtain the average signal intensity in the signal intensity detecting part 9. Hence, a structure according to the third preferred embodiment does not use all modulation signal intensities as the average signal intensity but utilizes an average intensity of the pilot signal to set the wavelength position once again.

Since the wavelength tunable filter apparatus has such a structure, use of the pilot signal which is positioned independently and irrespectively of the group of modulation signals allows to structure an electric circuit for wavelength adjustment independently of a spectrum of a modulation signal which is to transmit. When the pilot signal is set on the low-frequency side, in particular, it is possible to realize the pilot signal detecting part 12 with a simple low-pass filter and it is not necessary that the signal intensity detecting part 9 has a high frequency response.

While the preferred embodiments above do not specify a type of the wavelength tunable filter, as the wavelength tunable filter, it is allowable to use any one of a filter using a diffraction grating, a fiber diffraction grating, an interference film filter, a Fabry-Perot etalon filter, an accoustooptic filter, and a Mach-Zehnder filter or a wavelength tunable filter which is formed by a combination of these.

Further, although the third preferred embodiment described above is an example where the pilot signal is used additionally, out of the group of modulation signals which are multiplexed with a sub-carrier, at least one may be selected as the average signal intensity,. In this case, the pilot signal is not necessary. This is effective to a situation where modulation signals which are sub-carrier -multiplexed intensively in some frequency bands, are used.

Figure 9:
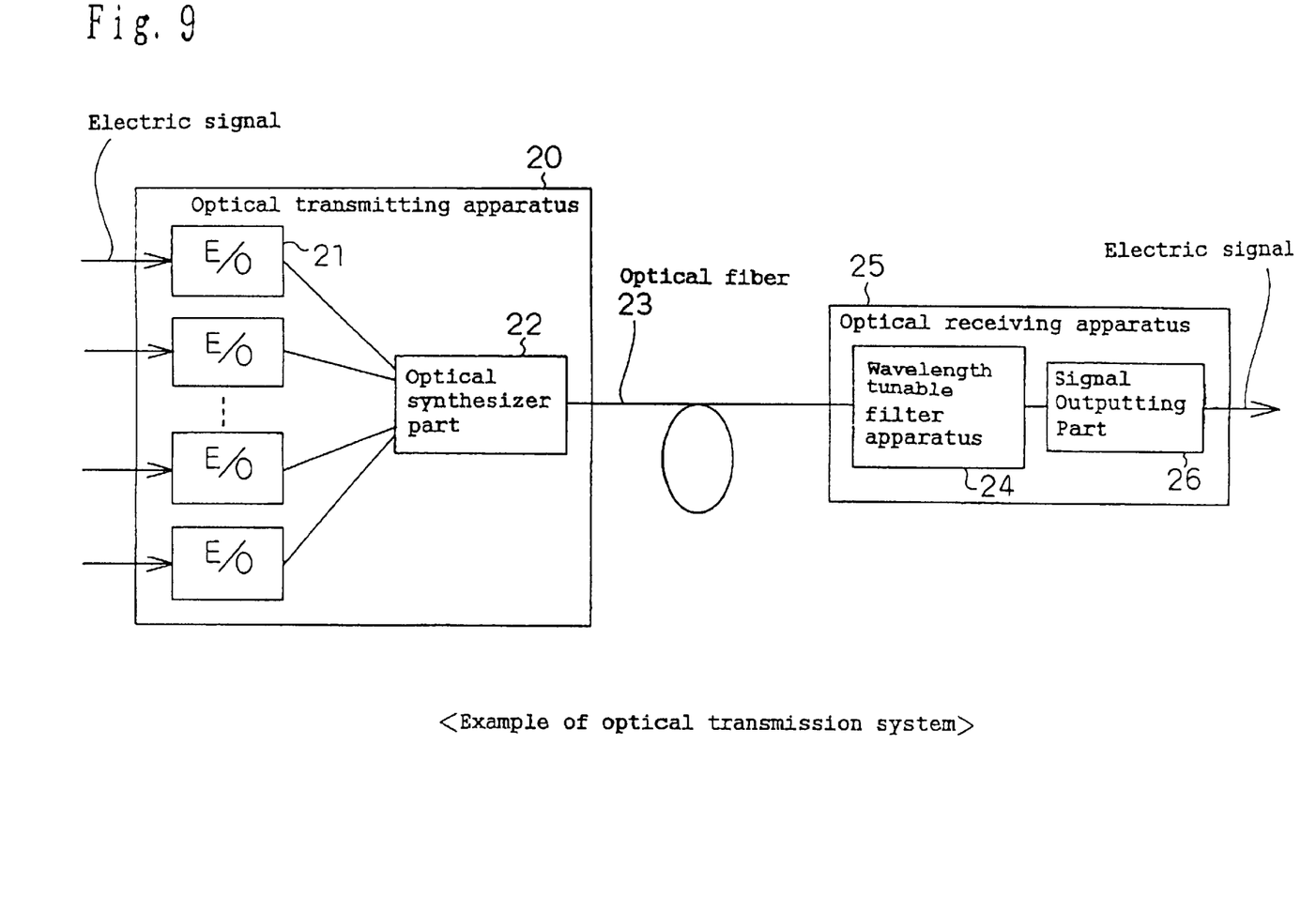
FIG. 9 is a structure diagram showing a preferred embodiment of an optical transmission system according to the present invention.

FIG. 9 is a structure diagram showing a preferred embodiment of an optical transmission system according to the present invention. In FIG. 9, denoted at 24 is the wavelength tunable filter apparatus described above, and denoted at 26 is a signal outputting part which outputs the output obtained from the signal component detecting part 8 which is disposed in the apparatus 24. An optical receiving apparatus 25 comprises the wavelength tunable filter apparatus 24 and the signal outputting part 26. Further, denoted at 20 is an optical transmitting apparatus which comprises an electro-optic conversion part 21 which converts an electric signal into light and an optical coupler portion 22. There are a plurality of electro-optic conversion parts 21, and the electro-optic conversion parts 21 can convert into light which have different wavelengths from each other. There may be only one electro-optic conversion part 21, instead.

An optical signal outputted from the optical coupler part 22 is supplied to the optical receiving apparatus 25 through an optical fiber 23 which is an optical transmission path.

Alternatively, it is allowable to omit the optical fiber 23 so as to supply directly to the optical receiving apparatus 25 from the optical transmitting apparatus 20.

As clearly described above, the wavelength tunable filter apparatus according to the present invention has an advantage that it is possible to accurately adjust the wavelength in a simple manner, by means of use of only light whose wavelength is the one to be selected, regardless of wavelength pitches or the number of multiplexing.

What is claimed is:

1. A wavelength tunable filter apparatus, comprising:

a wavelength tunable filter which can change a wavelength to be selected for an inputted optical signal;

a photoelectric conversion part which converts transmitted light received from said wavelength tunable filter into an intensity signal;

an intensity detecting part which detects an intensity from said intensity signal which is converted;

a signal component detecting part which detects a signal component from said intensity signal;

a signal intensity detecting part which detects an intensity of said signal component which is detected;

an intensity variation detecting part which detects a variation in said intensity detected by said intensity detecting part and an intensity variation in said signal component detected by said signal intensity detecting part; and wavelength setting means which, on the basis of both said detected variations, causes said wavelength tunable filter to change the wavelength to be selected so as to set the wavelength appropriately such that an output from said photoelectric conversion part satisfies a predetermined condition.

2. The wavelength tunable filter apparatus of claim 1, wherein a direction of the changing of the wavelength to be selected by said wavelength tunable filter is determined based on said both variations.

3. The wavelength tunable filter apparatus of claim 1, wherein the wavelength to be selected by said wavelength tunable filter is changed by a feedback method.

4. The wavelength tunable filter apparatus of claim 1, wherein said wavelength setting means comprises a wavelength/intensity memory part which stores in advance reference data which describe a state of the intensity variation in said intensity signal in a direction in which said wavelength tunable filter changes the wavelength and/or a state of the intensity variation in said signal component, and the wavelength to be selected by said wavelength tunable filter is changed in accordance with comparison of said reference data against at least one of said detected variations.

5. The wavelength tunable filter apparatus of claim 4, wherein when a relationship between said both two variations is such a relationship which is indicative of predetermined abnormality, said wavelength setting means transmits a signal notifying of the abnormality and/or stops wavelength scanning.

6. The wavelength tunable filter apparatus of claim 1, wherein said wavelength setting means sets as a set wavelength a wavelength which maximizes the intensity of said intensity signal.

7. The wavelength tunable filter apparatus of claim 1, wherein said wavelength setting means sets as a set wavelength a wavelength which maximizes the intensity of said signal component.

8. The wavelength tunable filter apparatus of claim 1, wherein said wavelength setting means sets as a set wavelength a wavelength which is between a wavelength which maximizes the intensity of said signal component and a wavelength which maximizes the intensity in said signal component.

9. The wavelength tunable filter apparatus of claim 1, wherein a difference between said both variations is further detected and said set wavelength is set based on the difference.

10. The wavelength tunable filter apparatus of any one of claims 1 through 9, wherein an electric signal detected by said signal component detecting part is a signal which is formed by multiplexing some modulated sub-carrier frequency component signals, one of the sub-carrier signals is selectively extracted, and the intensity of the extracted signal component is supplied to said signal intensity detecting part.

11. The wavelength tunable filter apparatus of any one of claims 1 through 9, wherein an electric signal detected by said signal component detecting part is a signal which is formed by multiplexing some modulated sub-carrier frequency component signals and a non-modulated sub-carrier frequency component signal, said non-modulated sub-carrier signal is selectively extracted, and the intensity of the extracted signal component is supplied to said signal intensity detecting part.

12. The wavelength tunable filter apparatus of according to claim 1, wherein used as said wavelength tunable filter is a wavelength tunable filter which is formed by any one of a filter using a diffraction grating, a fiber diffraction grating, an interference film filter, a Fabry-Perot etalon filter, an acoustic optic filter, and a Mach-Zehnder filter or a wavelength tunable filter which is formed by a combination of these filters.

13. An optical receiving apparatus which receives at least one wavelength light and comprises:

the wavelength tunable filter apparatus of claim 1; and a signal outputting part which outputs an electric signal component from said signal component detecting part of said wavelength tunable filter.

14. An optical transmission apparatus, comprising:

an optical transmitting apparatus which comprises one electro-optic conversion part which receives an electric signal and electro-optically converts the electric signal into an optical signal having a predetermined wavelength, or a plurality of electro-optic conversion parts each receiving an electric signal and electro-optically converting the electric signals into optical signals whose wavelengths are different from each other, and an optical coupler part which combines the optical signals outputted from said electro-optic conversion part or parts; and the optical receiving apparatus of claim 13 which directly or indirectly receives an optical signal outputted from said optical transmitting apparatus.

15. An optical transmission system, comprising:

an optical transmitting apparatus which comprises one electro-optic conversion part which receives an electric signal and electro-optically converts the electric signal into an optical signal having a predetermined wavelength, or a plurality of electro-optic conversion parts each receiving an electric signal and electro-optically converting the electric signals into optical signals whose wavelengths are different from each other, and an optical coupler part which combines the optical signals outputted from said electro-optic conversion part or parts;

an optical transmission path for transmitting an optical signal outputted from said optical transmitting apparatus; and the optical receiving apparatus of claim 13 which receives an optical signal outputted from said optical transmission path.

* * * * *